United States Patent [19]
Hirokawa

[11] Patent Number: 6,115,144
[45] Date of Patent: *Sep. 5, 2000

[54] DATA PROCESSING APPARATUS AND SYSTEM

[75] Inventor: Masashi Hirokawa, Atsugi, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,019

[22] Filed: Sep. 17, 1996

[30] Foreign Application Priority Data

Sep. 19, 1995 [JP] Japan .................................. 7-263670

[51] Int. Cl.$^7$ .............................. H04N 1/32; H04N 1/00; H04N 1/40
[52] U.S. Cl. ........................... 358/468; 358/404; 358/444
[58] Field of Search .................................... 358/468, 442, 358/444, 404, 426, 433, 434, 400, 406, 448; 379/100.1

[56] References Cited

U.S. PATENT DOCUMENTS

| | | | |
|---|---|---|---|
| 4,652,933 | 3/1987 | Koshiishi | 358/256 |
| 4,706,126 | 11/1987 | Kondo | 358/257 |
| 5,027,317 | 6/1991 | Pepera et al. | 364/900 |
| 5,115,410 | 5/1992 | Hirata et al. | 395/650 |
| 5,131,089 | 7/1992 | Cole | 395/500 |
| 5,148,293 | 9/1992 | Miyachi | 358/444 |
| 5,204,813 | 4/1993 | Samph et al. | 364/419 |
| 5,323,450 | 6/1994 | Goldhagen et al. | 358/442 |
| 5,408,614 | 4/1995 | Thornton et al. | 395/275 |
| 5,530,847 | 6/1996 | Schieve et al. | 395/183.14 |
| 5,542,082 | 7/1996 | Solhjell | 395/442 |
| 5,550,649 | 8/1996 | Wong et al. | 358/479 |
| 5,621,892 | 4/1997 | Kita et al. | 358/468 |
| 5,636,037 | 6/1997 | Saitoh | 358/442 |
| 5,673,392 | 9/1997 | Nakashima et al. | 395/200.01 |
| 5,694,600 | 12/1997 | Khenson et al. | 395/652 |
| 5,758,321 | 5/1998 | Lee | 704/270 |
| 5,786,885 | 7/1998 | Satoh | 395/309 |

FOREIGN PATENT DOCUMENTS 63-31367 2/1988 Japan .
1-245664 9/1989 Japan .

OTHER PUBLICATIONS

Mark Nelson, "Data Compression Handbook, Compression Technique Introduction for C–Programmers", First Edition published Mar. 31, 1994, Toppan Co., Ltd., pp. 16–19 and 392–393.

28F016SA 16–Mbit FlashFile™ Memory User's Manual of Intel Corporation, pp. 1–1 through 1–5.

*Primary Examiner*—Madeleine Nguyen
*Attorney, Agent, or Firm*—Oblon, Spivak, McClelland, Maier & Neustadt, P.C.

[57] ABSTRACT

A body apparatus performs facsimile basic-system functions, the body apparatus includes an optional-function compressed program data storage area, the optional-function compressed program data storage area previously storing optional-function compressed program data. An option unit is loaded in the body apparatus for enabling the facsimile apparatus to perform an optional function of the facsimile apparatus, other than the facsimile basic-system functions. The option unit includes an optional-function program data storage area. Responding to the optional unit being loaded in the body apparatus, the body apparatus reads the optional-function compressed program data from the optional-function compressed program data storage area, decompresses the optional-function compressed program data, stores decompressed optional-function program data in the optional-function program data storage area of the option unit and executes the decompressed optional-function program data stored in the optional-function program data storage area of the option unit, and performs the optional function of the facsimile apparatus.

20 Claims, 13 Drawing Sheets

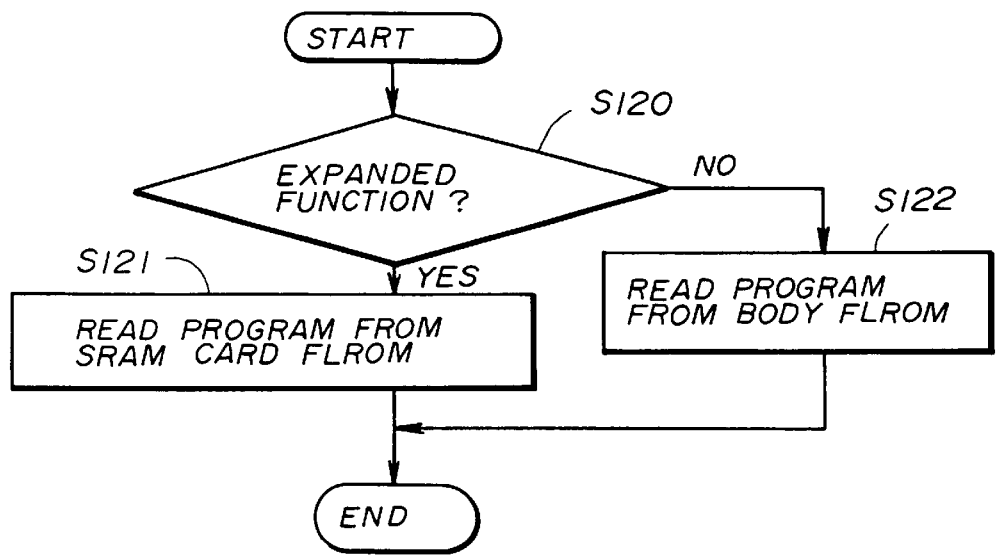
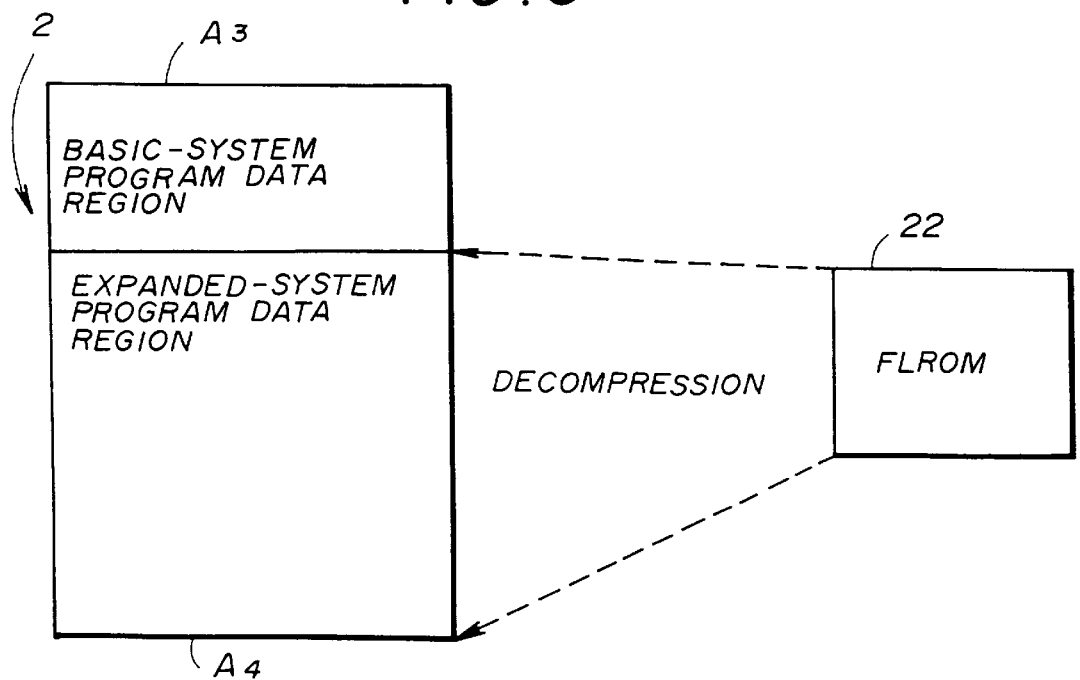

DATA PROCESSING APPARATUS AND SYSTEM

BACKGROUND OF THE INVENTION

1. Field of the Invention

The present invention relates to a data processing apparatus and system, such as a facsimile apparatus and system which includes a body apparatus and option units which can be connected to the body apparatus, and also relates to a facsimile apparatus which can be connected to an external apparatus and includes a function of image reading/recording operations according to instructions given by the external apparatus.

2. Description of the Related Art

A facsimile apparatus includes a body apparatus which performs basic-system functions, and a plurality of option units, each of which can be connected to the body apparatus and thereby perform particular additional (optional or expanded-system) functions. By connecting one or a plurality of option units to each of a plurality of body apparatuses differently, it is possible to cause a plurality of facsimile apparatuses in a same series to perform different functions so as to form a plurality of types of facsimile apparatuses.

The basic-system functions are well-known facsimile functions wherein an original image on a sheet of paper is scanned by the facsimile apparatus and image data is input to the apparatus, the image data is transmitted to another facsimile apparatus as an electric signal via the PSTN (Public Switched Telephone Network), the other facsimile apparatus forms a corresponding image from the received electric signal, and the formed image is printed on a sheet of paper which is provided from the other facsimile apparatus. An expanded-system function may be a well-known function such as a group 4 facsimile function, the basic function of which is standardized in the CCITT Group 4, and may be added to the function of the basic group 3 facsimile apparatus, the basic function thereof being standardized in the CCITT Group 3, a printer interface function, a roll-paper cutting function, a fax-on-demand function, a video-on-demand function, or the like.

Further, by connecting arbitrary option units to a body apparatus, it is possible to enable the single facsimile apparatus to perform not only the basic-system functions but also particular functions of the thus-connected option units. Thereby, it is possible to freely configure the facsimile apparatus which has desired functions. Thus, a variety of apparatus configuration can be obtained.

SUMMARY OF THE INVENTION

The present invention has been made in view of the above-mentioned problems, and, an object of the present invention is to provide a facsimile apparatus in which functions of the apparatus can be easily expanded, and, also, cost of the apparatus can be restricted.

A facsimile apparatus according to the present invention comprises:
 a body apparatus which performs facsimile basic-system functions, the body apparatus comprising optional-function compressed program data storage means, the optional-function compressed program data storage means previously storing optional-function compressed program data;
 an option unit (SRAM card 15) which is loaded in the body apparatus for enabling the facsimile apparatus to perform an optional function of the facsimile apparatus, other than the facsimile basic-system functions, the option unit comprising optional-function program data storage means; and
 optional-function program data processing means, responding to the optional unit being loaded in the body apparatus, for reading the optional-function compressed program data from the optional-function.

In such type of facsimile apparatus, the body apparatus controls every possible option unit which may be connected thereto. For this purpose, the body apparatus is previously provided with control program data required for controlling every possible option unit. As a result, storage means (for example, ROM (Read Only Memory) or the like) for storing program data of the body apparatus should have very large storage capacity for storing the above-mentioned control program data required for controlling every possible option unit. Thereby, cost of the apparatus is relatively high.

Further, there is a facsimile apparatus which can be connected to an external apparatus such as a personal computer apparatus and can be used as a scanner and/or printer of the external apparatus. In such a facsimile apparatus, even when being connected to the external apparatus, function program data which is necessary when being connected to the external apparatus should be previously stored in the facsimile apparatus. For this purpose, storage means for storing such function program data should have a relatively large storage capacity. Thereby, cost of the apparatus is relatively high. compressed program data storage means, decompressing the optional-function compressed program data, storing decompressed optional-function program data in the optional-function program data storage means of the option unit and executing the decompressed optional-function program data stored in the optional-function program data storage means of the option unit, and performing the optional function of the facsimile apparatus.

By storing the optional-function program data in the compressed state in the body apparatus, it is possible to reduce program data storage capacity provided in the body apparatus of the facsimile apparatus. Thus, it is possible to reduce basic costs of the facsimile apparatus.

Another facsimile apparatus according to the present invention comprises:
 a body apparatus which performs facsimile basic-system functions, the body apparatus comprising optional-function program data storage means;
 an option unit which is loaded in the body apparatus for enabling the facsimile apparatus to perform an optional function of the facsimile apparatus, other than the facsimile basic-system functions, the option unit comprising optional-function compressed program data storage means which previously stores optional-function compressed program data; and
 optional-function program data processing means, responding to the optional unit being loaded in the body apparatus, for reading the optional-function compressed program data from the optional-function compressed program data storage means of the option unit, decompressing the optional-function compressed program data, storing decompressed optional-function program data in the optional-function program data storage means of the body apparatus and executing the decompressed optional-function program data stored in the optional-function program data storage means of the body apparatus, and performing the optional function of the facsimile apparatus.

Such a system is advantageous in a case where a new facsimile apparatus has been developed and manufactured, and the body apparatus thereof should be shipped first. However, the option unit (SRAM card 15) may be shipped later. In such a case, a time period can be given for a designer, between the body apparatus shipping date and the option unit shipping date. During the thus-given time period, the designer may complete design work of a system program which should be loaded in the option unit. Thus, the apparatus-manufacturing work and the program design work may be conveniently adapted to the product shipping schedule.

Further, the storage means of the option unit has the program data stored therein in the compressed state. Thereby, it is possible to reduce storage capacity of the option unit. As a result, it is possible to reduce the costs of the option unit, and reduce the overall costs of the facsimile apparatus.

Another facsimile apparatus according to the present invention comprises:

basic-system function performing means for performing facsimile basic-system functions, the basic-system function performing means comprising optional-function program data storage means;

data communication means for enabling the facsimile apparatus to perform an optional function of the facsimile apparatus, other than the facsimile basic-system functions; and optional-function program data processing means for receiving optional-function compressed program data from an external apparatus via the data communication means, decompressing the optional-function compressed program data, storing decompressed optional-function program data in the optional-function program data storage means of the basic-system performing means and executing the decompressed optional-function program data stored in the optional-function program data storage means of the basic-system function performing means, and performing the optional function of the facsimile apparatus.

In this system, it is also possible that the contents of program data stored in the body apparatus can be updated by an external apparatus such as a personal computer apparatus. Thereby, it is possible to flexibly configure a computer system.

Other objects and further features of the present invention will become more apparent from the following detailed description when read in conjunction with the accompanying drawings.

BRIEF DESCRIPTION OF THE DRAWINGS

FIG. 5 shows an operation flowchart as an example performed by the CPU when performing a function processing;

FIG. 6 shows division of the FLROM of the body apparatus and the FLROM in the SRAM card, in a second embodiment of the present invention;

DETAILED DESCRIPTION OF THE PREFERRED EMBODIMENTS

With reference to the accompanying figures, the preferred embodiments of the present invention will now be described.

Figure 1:
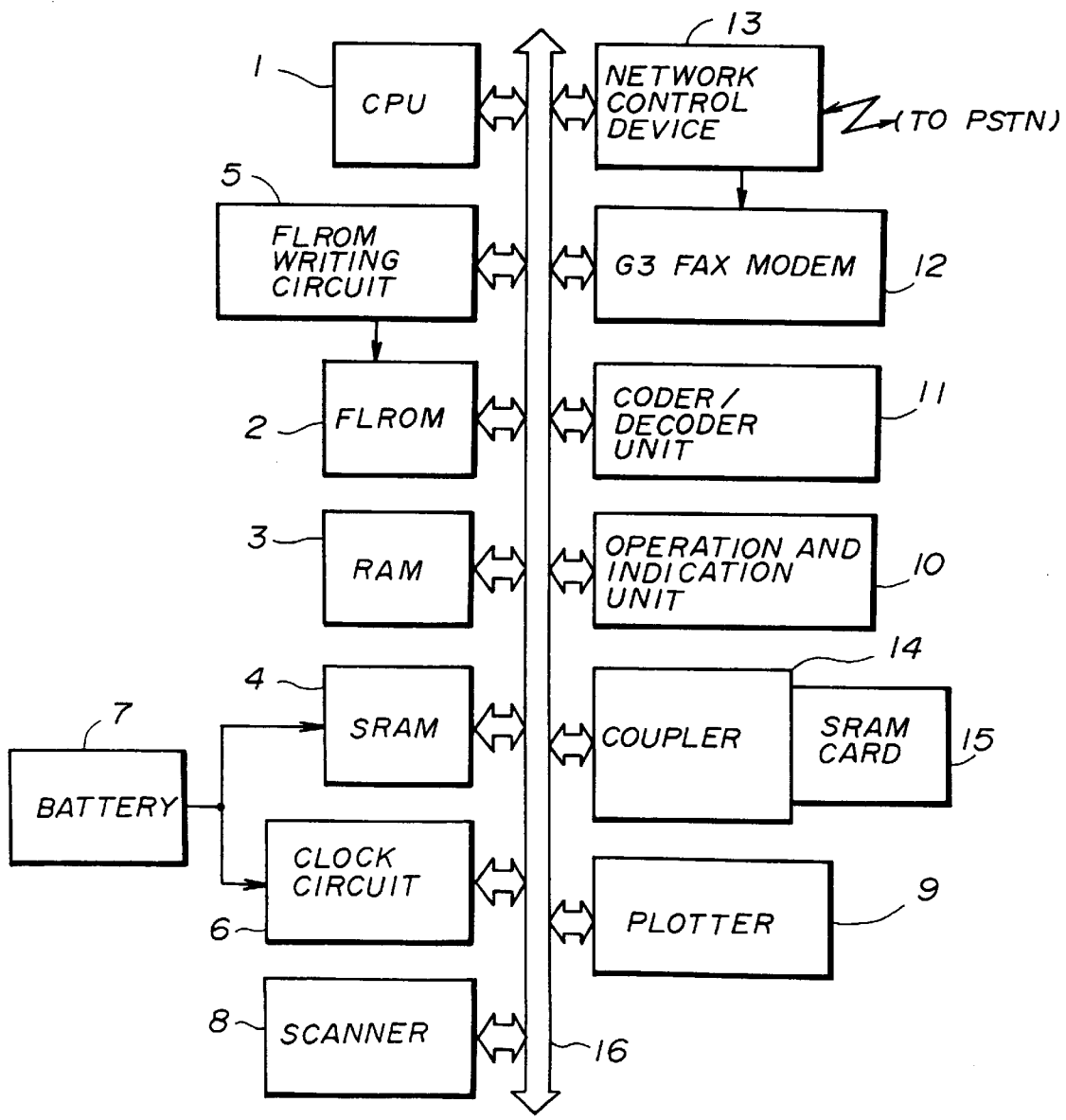
FIG. 1 shows a block diagram of a group 3 facsimile apparatus in a first embodiment of the present invention.

FIG. 1 shows a block diagram of a group 3 facsimile apparatus in a first embodiment of the present invention. The group 3 facsimile apparatus includes a body apparatus and a SRAM card (which will be described later) serving as an option unit.

In the figure, a CPU (Central Processing Unit) 1 performs control processing for controlling every component of the facsimile apparatus, and also performs a facsimile transmission processing control procedure. A FLROM (flash ROM) 2 is a rewriteable ROM, and stores control processing programs which the CPU 1 executes, various data which is used by the CPU 1 when executing the control processing programs, and so forth. One example of the FLROM is a 28F016SA 16-Mbit FlashFile™ Memory of Intel Corporation of the United States of America (see 28F016SA 16-Mbit FlashFile™ Memory User's Manual). Further, the FLROM may comprise a simple flash memory. A RAM (Random Access Memory) 3 configures a work area of the CPU 1. A SRAM (Static RAM) 4 stores various parameters which are special to this group 3 facsimile apparatus. A FLROM writing circuit 5 performs a data writing operation for rewriting the storage contents of the FLROM 2. A circuit such as the FLROM writing circuit 5 is not needed when a certain type of the FLROM is used.

A clock circuit 6 outputs current date time information. A battery 7 supplies power and thus prevents, during a commercial power supply failure, the storage contents of the SRAM 4 from being erased and the clock circuit 6 from stopping its clocking operation. Thereby, the SRAM 4 can act as a non-volatile memory.

A scanner 8 reads an original image (or an original document) at a predetermined resolution. That is, for example, in a well-known manner, a paper sheet on which a document and/or a picture are present is set on a predetermined paper feeding mechanism, then the paper feeding mechanism automatically feeds the paper sheet, and the scanner 8 scans the document and/or picture on the paper sheet. The scanned image data is converted into an electric signal. A plotter 9 prints out an image signal at a predetermined resolution, in a well-known manner, through the plotter, and image data carried by the image signal is reproduced on a paper sheet, and the paper sheet is ejected from the facsimile apparatus. An operation and indication unit 10 includes various operation keys/switches and indication devices for a user to appropriately operate the facsimile apparatus.

A coder/decoder unit 11 codes and compresses an image signal, and, also, decodes and decompresses the coded and compressed image signal so as to obtain an original image signal. A group 3 facsimile modem 12 is provided for performing group 3 facsimile modem functions. Specifically, the group 3 facsimile modem 12 is provided with low-speed modem functions (V.21 modem) for transmitting and receiving transmission procedure signals, and high-speed modem functions (V.17 modem, V.33 modem, V.29 modem, V.27ter modem and so forth) for transmitting and receiving image information.

A network control device 13 is provided for connecting the facsimile apparatus to a Public Switched Telephone Network, and has automatic calling and call-receiving functions.

A coupler 14 is provided for removably connecting a SRAM card 15 to the facsimile apparatus. In this case, for example, the SRAM card 15 is used as a SAF (Store And Forward) memory for storing a plurality of image data and/or memory means for storing additional parameter data.

The CPU 1, FLROM 2, RAM 3, SRAM 4, FLROM writing circuit 5, clock circuit 6, scanner 8, plotter 9, operation and indication unit 10, coder/decoder unit 11, group 3 facsimile modem 12, network control device 13 and coupler 14 are connected to an internal bus 16. Data transmission between these components is mainly performed via the internal bus 16. Further, the SRAM card 15 is connected to the internal bus via the coupler 14.

Data transmission between the network control device 13 and group 3 facsimile modem 12 is directly performed.

Figure 2:
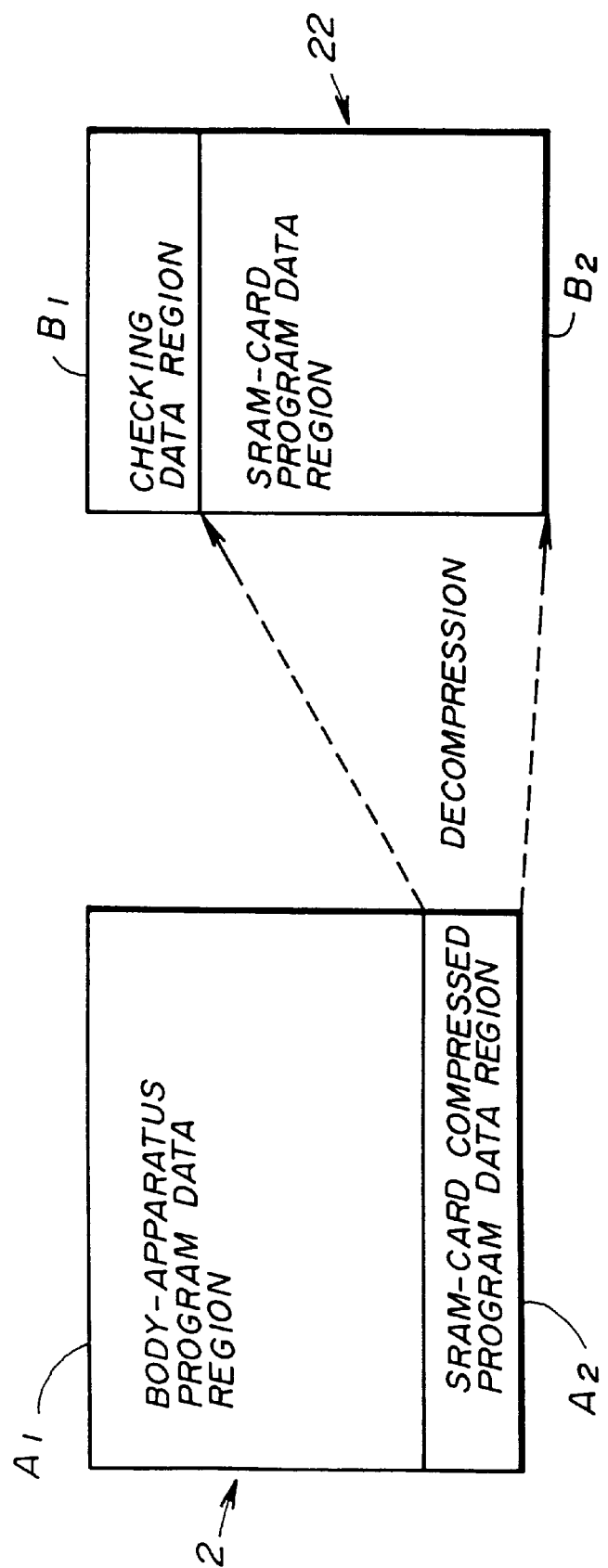
FIG. 2 shows division of a FLROM of a body apparatus of the group 3 facsimile apparatus shown in FIG. 1, and division of a FLROM of a SRAM card 15.

As shown in FIG. 2, the storage area of the FLROM 2 is divided into a body-apparatus program data region $A_1$ and a SRAM-card compressed program data region $A_2$. In the body-apparatus program data region $A_1$, control program data is stored for controlling basic-system functions of the facsimile apparatus. In the SRAM-card compressed program data region $A_2$, SRAM-card compressed program data is stored. The data is used when the SRAM card 15 is connected to the body apparatus via the coupler 14, for the CPU 1 to control optional functions to be performed as additional (expanded-system) functions of the facsimile apparatus. The SRAM-card compressed program data stored in the SRAM-card compressed program data region $A_2$ is produced as a result of compressing original SRAM-card program data in a predetermined data compression method. The term 'body apparatus' refers to a portion of the facsimile apparatus including all the components, described above with reference to FIG. 1, other than the SRAM-card 15.

The predetermined data compression method may comprise, for example, a well-known LZW method or another appropriate well-known data compression method. With regard to the LZW method, see Japanese publication, Data Compression Handbook, Compression Technique Introduction for C-Programmers, written by Mark Nelson, translated by Takeshi Ogiwara and Suguru Yamaguchi, first edition published Mar. 31, 1994, published by Toppan Co., Ltd., pages 16–19 and 393.

Figure 3:
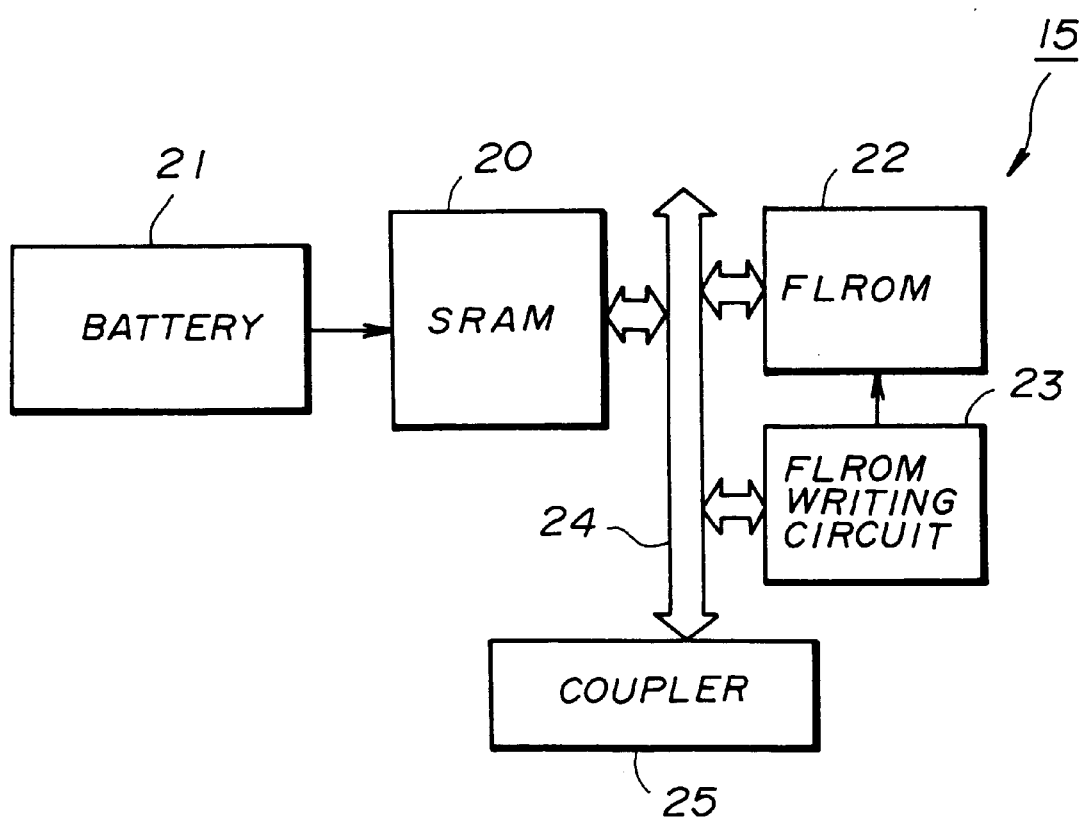
FIG. 3 shows a block diagram of an example of the SRAM card used in the first embodiment.

FIG. 3 shows a configuration example of the SRAM card 15.

With reference to FIG. 3, a SRAM 20 stores various data and has a battery 21 connected thereto. The battery 21 supplies power to the SRAM 20 for preventing the storage contents of the SRAM 20 from erasing during a power supply failure occasion. Thereby, the SRAM 20 acts as a non-volatile memory.

An FLROM 22 is similar to the FLROM 2, and a rewriteable ROM. A FLROM writing circuit 23 performs a data writing operation for rewriting the storage contents of the FLROM 22. A circuit such as the FLROM writing circuit 23 is not needed when a certain type of the FLROM is used.

Those SRAM 20, FLROM 22 and FLROM writing circuit 23 are connected to an internal bus 24. Data transmission between these components is performed via the internal bus 24.

The arrangement of the SRAM card 15 is not limited to the arrangement described above with reference to FIG. 3. It is also possible that the SRAM-card 15 is replaced by a simple FLROM or a simple SRAM. Further, the SRAM card 15 can be replaced with any information storage device which provides an information storage capacity for storing the SRAM-card program data which is obtained as a result of decompressing the SRAM-card compressed program data stored in the FLROM 2 of the body apparatus. The CPU 1 of the body apparatus can read this program data from the information storage device and perform an expanded-system function of the facsimile apparatus.

A coupler 25 is connected to the internal bus 24. The coupler 25 is directly connected to the coupler 14 of the body apparatus. Thereby, via the couplers 14 and 25, the internal bus 16 of the body apparatus is connected with the internal bus 24 of the SRAM-card 15. As a result, the CPU 1 appropriately accesses the SRAM 20 and FLROM 22, and reads data therefrom and writes data thereinto.

Figure 4:
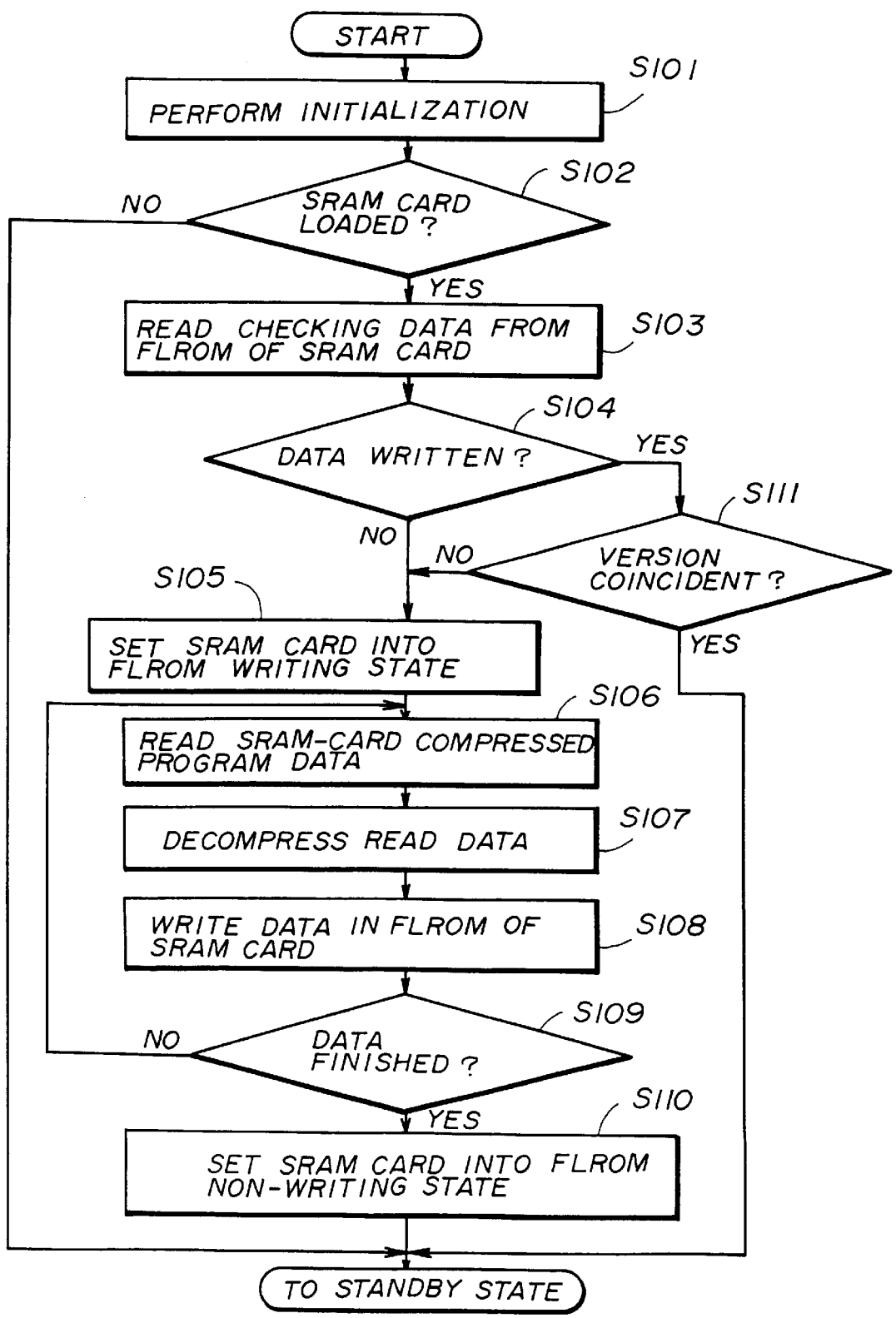
FIG. 4 shows an operation flowchart as an example of an operation starting from an initialization operation when power is supplied to the apparatus as performed by a CPU of the body apparatus shown in FIG. 1 in the first embodiment.

The CPU 1 performs processing, which will now be described with reference to FIG. 4, starting when commercial power is supplied to the facsimile apparatus which then first performs a predetermined initialization processing.

In a step S101 (the term 'step' being omitted, hereinafter), the predetermined initialization processing is performed for initializing the facsimile apparatus. In S102, it is determined whether or not the SRAM card 15 is loaded in the coupler 14. This determination of S102 can be performed by, for example, providing a switch or the like which mechanically operates as the SRAM card 15 is loaded in the coupler 14.

If the determination result of S102 is YES, the FLROM 22 of the SRAM card 15 is accessed, and data is read from a checking data storage region $B_1$ of the FLROM 22 (as shown in FIG. 2), in S103. In the checking data storage region of the FLROM 22, an identification name of each program data stored in the FLROM 22, version-number data indicating the version number of each program data and so forth are stored.

Immediately after the SRAM card 15 is loaded in the coupler 14, no effective data has not been written in the FLROM 22 of the SRAM card 15. As a result, in S103, no effective data can be read out from the checking data storage region of the FLROM 22. As a result, S104 determined that data writing in the FLROM 22 has not been performed, and the determination result of S104 is NO.

When the determination result of S104 is NO, the FLROM writing circuit 23 of the SRAM card 15 sets the FLROM 22 to a state in which data can be written in the FLROM 22, in S105.

Then, in S106, the above-mentioned SRAM-card compressed program data is read out from the SRAM-card compressed program data region $A_2$ of the FLROM 2. The thus-read SRAM-card compressed program data is decompressed into the original SRAM-card program data in S107 in a predetermined decompressing method. The decompressing method is a decompressing method suitable for decompressing data which was compressed in the compression method used for compressing the original SRAM-card program data into the SRAM-card compressed program data.

The thus-obtained original SRAM-card program data is written in a SRAM-card program data region $B_2$ (shown in FIG. 2) of the FLROM 22 of the SRAM card 15, in S108.

S106, S107 and S108 are performed repeatedly and the processing is performed on all the SRAM-card compressed program data stored in the SRAM-card compressed program data region $A_2$ of the FLROM 2, by the determination function of S109. It is also possible to overwrite, a plurality of times, the same data on the FLROM 22 so as to improve data storage condition in the FLROM 22.

When all the SRAM-card compressed program data stored in the SRAM-card compressed data storage region $A_2$ of the FLROM 2 is read, is decompressed and is written in the FLROM 22 in the SRAM card 15, the determination result of S109 is YES. Then, the FLROM writing circuit 23 of the SRAM card 15 sets the FLROM 22 into a state in which data cannot be written in the FLROM 22, in S110. Then, the CPU 1 enters a standby state.

By the above-described operations, the FLROM 22 in the SRAM card 15 has the SRAM-card program data written therein. The SRAM-card program data is used by the CPU 1 and thus the group 3 facsimile apparatus performs the additional (expanded-system) functions.

If the FLROM 22 of the SRAM card 15 already has the SRAM-card program data written therein as described above, and commercial power is cut and then restored to the facsimile apparatus, because the FLROM 22 of the SRAM card 15 already has the SRAM-card program data written therein, effective data is read in S103 and thereby the determination result of S104 is YES. Then, in S111, it is determined whether or not the version number read out from the checking data storage region of the FLROM 22 in S103 is suitable for the version number of the body apparatus. A case may occur where the SRAM card 15 was previously loaded in another apparatus which had a version number different from the version number of the present facsimile apparatus, and has SRAM-card program data which was read out from the other apparatus and was written in the FLROM 22. In such a case, the version number of the data written in the FLROM 22 is different from the version number of the present facsimile apparatus. If the CPU 1 of the facsimile apparatus attempts to execute a program of a different version, the facsimile apparatus may not perform normal operations, and may cause an accident. In the case where the determination result of S111 is NO, the above-described operations starting from S105 are performed, and the data read out from the present facsimile apparatus is written in the FLROM 22 of the SRAM card 15. When the determination result of S111 is YES, it is determined that the FLROM 22 has the SRAM-card program data which is read out from the FLROM 2 of the present facsimile apparatus and was appropriately decompressed. Therefore, the CPU 1 enters the standby state.

Further, when the determination result of S102 is NO, which means that no SRAM card is loaded in the coupler 14, the CPU 1 enters the standby state.

With reference to FIG. 5, an example of processing performed by the CPU 1 when a function is performed by the facsimile apparatus will now be described.

When the CPU 1 performs a function, the CPU 1 determines in S120 whether or not the function is an expanded-system function. If the determination result of S120 is YES, it is determined that program data for the function to be performed is not stored in the FLROM 2 of the facsimile apparatus, but is stored in the FLROM 22 of the SRAM card 15. Therefore, the CPU 1 reads the program data from the FLROM 22 of the SRAM card 15, in S121. This program data is program data which is executed by the CPU and thus performs the expanded-system function through the CPU 1. If the determination result of S120 is NO, it is determined that the function to be performed is not the expanded-system function but is a basic-system function. Therefore, program data for the basic-system function is stored in the FLROM 2 of the facsimile apparatus. Therefore, the CPU 1 reads the program data from the FLROM 2 of the SRAM card 15, in S122. This program data is program data which is executed by the CPU and thus performs that basic-system function through the CPU 1.

Thus, in the first embodiment of the present invention, when the SRAM card 15 (option unit) is loaded in the body apparatus of the facsimile apparatus, the SRAM-card compressed program data, which is previously stored in the FLROM 2 of the body apparatus, is decompressed, and then is written in the SRAM-card program data region $B_2$ of the FLROM 22 of the SRAM card 15. Then, when the expanded-system function, which can be performed when the SRAM card 15 is loaded in the facsimile apparatus, is to be performed, the CPU 1 reads the necessary program data from the SRAM-card program data region $B_2$ of the FLROM 22 of the SRAM card 15. Thereby, it is possible to reduce storage capacity of the FLROM 2 of the body apparatus of the facsimile apparatus. Thus, it is possible to reduce basic costs of the facsimile apparatus.

Further, in a case where the SRAM-card program data region $B_2$ of the FLROM 22 of the SRAM card 15 previously has program data stored therein, the version number of which is not coincident with the version number of the program data of the body apparatus (NO of the determination result of S111 shown in FIG. 4), the SRAM-card compressed program data stored in the FLROM 2 of the body apparatus is decompressed and is overwritten in the SRAM-card program data region $B_2$ of the FLROM 22 of the SRAM card 15. Thus, the version number of the program data stored in the FLROM 22 of the SRAM card 15 is adapted to the version number of the program data of the body apparatus. As a result, the expanded-system function can be properly performed by the facsimile apparatus.

A facsimile apparatus in a second embodiment of the present invention will now be described. In the second embodiment, the system configurations of the facsimile apparatus, including the body apparatus and SRAM card 15 are the same as that of the first embodiment shown in FIGS. 1 and 3. However, in the second embodiment, the FLROM 22 of the SRAM card 15 has an expanded-system compressed program data previously stored therein. The expanded-system compressed program data is obtained as a result of compressing in a predetermined data compression method (such as that described above) an expanded-system program data. Further, as shown in FIG. 6, the FLROM 2 of the body apparatus has a basic-system program data region $A_3$ for storing program data which is used by the CPU 1 when performing the basic-system functions, and an expanded-system program data region $A_4$ for storing the above-mentioned expanded-system program data which is used by the CPU 1 when performing an expanded-system function. In the basic-system program data region $A_3$ has the program data previously stored therein for performing those basic-system functions.

Then, when the SRAM card 15 is loaded in the body apparatus, the CPU 1 of the body apparatus reads the expanded-system compressed program data from the FLROM 22 of the SRAM card 15, decompresses the read program data and writes the decompressed expanded-system program data in the expanded-system program data region $A_4$ of the FLROM 2 of the body apparatus. Then, when the expanded-system function is to be performed, the expanded-system program data thus stored in the expanded-system program data region $A_4$ of the FLRON 2 of the body apparatus is read, is executed by the CPU, and the expanded-system function is properly performed.

The expanded-system compressed program data stored in the FLROM 22 of the SRAM card 15 is obtained from expanded-system program data in a form that can be executed by the CPU 1 of the body apparatus even in a case where the version number of the program data of the body apparatus is any possible number.

Also in the second embodiment, the arrangement of the SRAM card 15 is not limited to the arrangement described above with reference to FIG. 3. It is also possible that the SRAM-card 15 is replaced by a simple FLROM or a simple SRAM. Further, the SRAM card 15 can be replaced with any information storage device which provides an information storage capacity for storing the SRAM-card compressed program data which will be decompressed and be written in the FLROM 2 of the body apparatus, and also the CPU 1 of the body apparatus can read this program data from the FLROM 2 and thus perform an expanded-system function of the facsimile apparatus.

Figure 7:
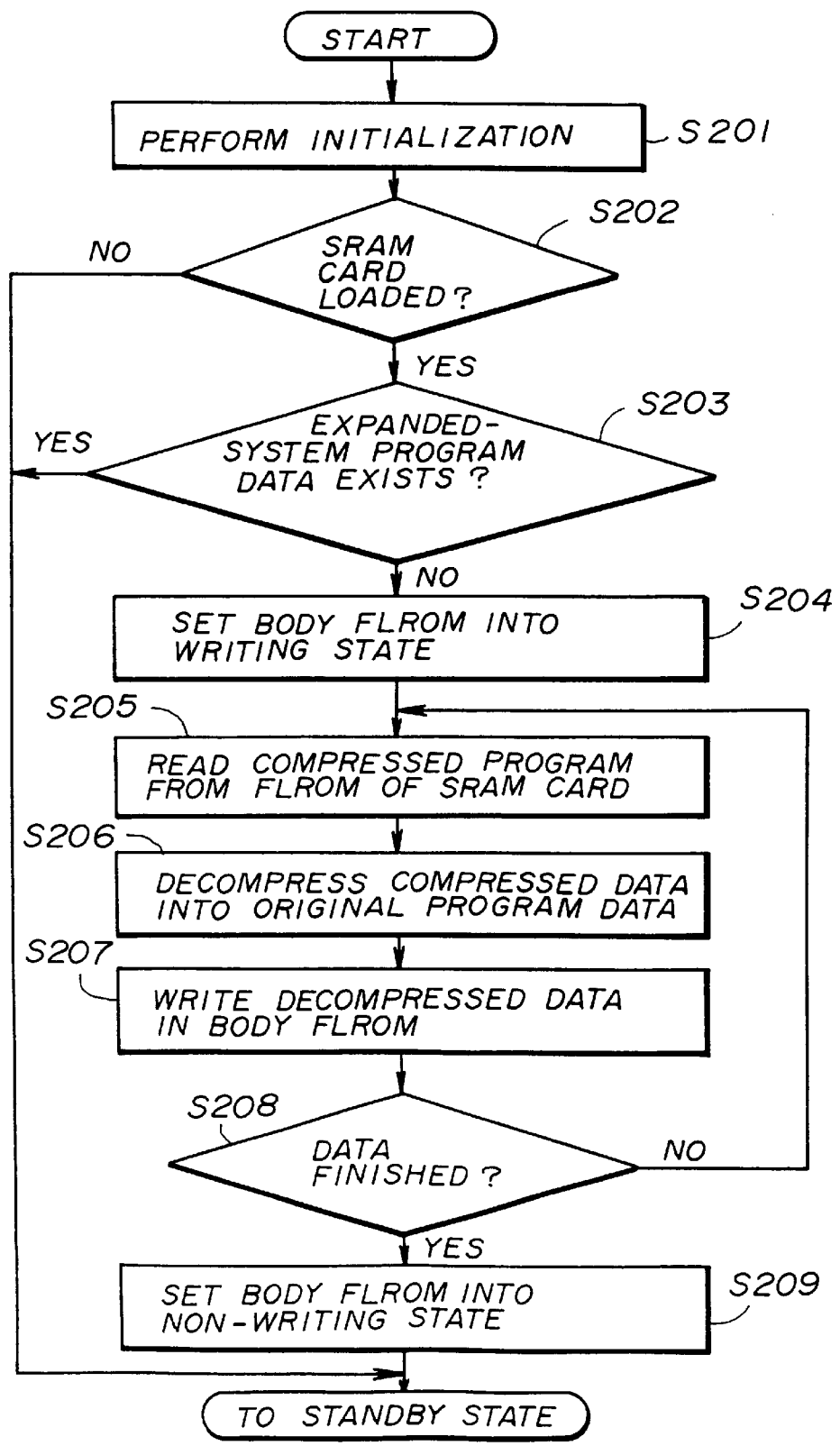
FIG. 7 shows an operation flowchart as an example of an operation starting from the initialization operation when power is supplied to the apparatus performed by the CPU of the body apparatus shown in FIG. 1 in the second embodiment.

With reference to FIG. 7, processing performed by the CPU 1 in the second embodiment of the present invention will now be described.

In step S201, the predetermined initialization processing is performed for initializing the facsimile apparatus. In S202, it is determined whether or not the SRAM card 15 is loaded in the coupler 14. This determination of S202 can be performed by, for example, providing a switch or the like, mentioned above, which mechanically operates as the SRAM card 15 is loaded in the coupler 14. If the determination result of S202 is YES, it is determined in S203 whether or not the expanded-system program data region of the FLROM 2 previously has an expanded-system program data stored therein. When the determination result of S204 is NO, the FLROM writing circuit 5 of the body apparatus sets the FLROM 2 to a state in which data can be written in the FLROM 2, in S204.

Then, in S205, the above-mentioned expanded-system compressed program data is read out from the FLROM 22 of the SRAM card 15. The thus-read expanded-system compressed program data is decompressed into the original expanded-system program data in S206 in a predetermined decompressing method. The decompressing method is a decompressing method suitable for properly decompressing data which was compressed in the compressing method which was used for compressing the original expanded-system program data into the expanded-system compressed program data.

The thus-obtained original expanded-system program data is written in the expanded-system program data region $B_4$ (shown in FIG. 6) of the FLROM 2 of the body apparatus, in S207. Steps S205, S206 and S207 are performed repeatedly and, the processing is performed on all the expanded-system compressed program data stored in the FLROM 22 of the SRAM card 15, by the determination function of S208. It is also possible to overwrite, a plurality of times, the same data on the expanded-system program data region $A_4$ of the FLROM 2 so as to improve a data storage condition in this region of the FLROM 2.

When all the expanded-system compressed program data stored in the FLROM 22 of the SRAM card 15 is read, is decompressed and is written in the FLROM 22 in the SRAM card 15, the determination result of S208 is YES. Then, the FLROM writing circuit 5 of the body apparatus sets the FLROM 2 into a state in which data cannot be written in the FLROM 2, in S209. Then, the CPU 1 enters a standby state.

By the above-described operations, the expanded-system program data region $A_4$ of the FLROM 2 of the body apparatus has the expanded-system program data written therein. The expanded-system program data is used by the CPU 1 and the group 3 facsimile apparatus performs the additional (expanded-system) functions.

When the determination result of S202 is NO, which means that no SRAM card is loaded in the coupler 14, the CPU 1 enters the standby state. When the determination result of S203 is NO, which means that an expanded-system program data is previously written in the expanded-system program data region $A_4$ of the FLROM 2 of the body apparatus, the CPU 1 enters the standby state.

Thus, in the second embodiment of the present invention, when the SRAM card 15 (option unit) is loaded in the body apparatus of the facsimile apparatus, the expanded-system compressed program data, which is previously stored in the FLROM 22 of the SRAM card 15, is decompressed, and then is written in the expanded-system program data region $B_4$ of the FLROM 2 of the body apparatus. Then, when the expanded-system function, which can be performed when the SRAM card 15 is loaded in the body apparatus, will be performed, the CPU 1 reads the necessary program data from the expanded-system program data region $B_4$ of the FLROM 2 of the body apparatus. Such a system as that of the second embodiment of the present invention is advantageous in a case where a new facsimile apparatus has been developed and manufactured, and the body apparatus thereof is shipped first. Then, the SRAM card 15, serving as an option unit, is shipped later. In such a case, a time period is given for a designer between the body apparatus shipping time and the SRAM card 15 shipping time. During this time period, the designer may complete design work of a system program which will be written in the SRAM card 15. Thus, the apparatus-manufacturing work and the program design work may be conveniently adapted to the product shipping schedule.

Further, in the second embodiment, the FLROM 22 of the SRAM card 15 has the expanded-system program data stored therein in a compressed state. Thereby, it is possible to reduce a necessary storage capacity of the FLROM 22. As a result, it is possible to reduce the costs of the SRAM card 15, serving as an option unit.

An option unit which can be applied to the facsimile apparatus in the present invention does not need to be limited to such a SRAM card 15. In a case where another option unit, such as a G4 unit for connecting with an ISDN and adding a group 4 facsimile function, is used as an option unit, the present invention can be similarly applied.

Figure 8:
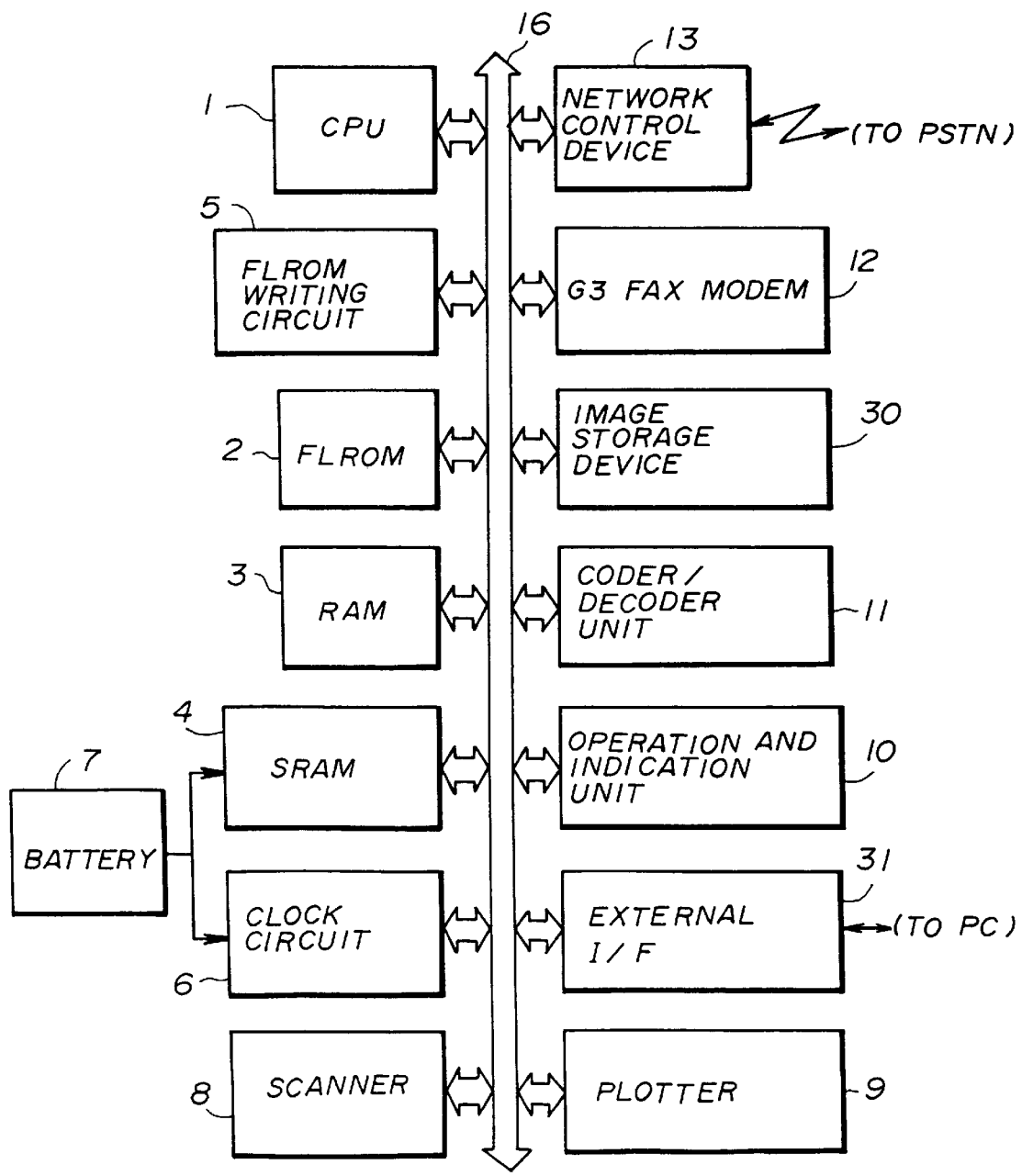
FIG. 8 shows a block diagram of a group 3 facsimile apparatus in a third embodiment of the present invention.

With reference to FIG. 8, a third embodiment of the present invention will now be described.

In each of the above-described first and second embodiments, a group 3 facsimile apparatus is used by itself. However, in the third embodiment, a personal computer apparatus (which may comprise a general-purpose computer) is connected with a group 3 facsimile apparatus, and thereby, a user can use, from the personal computer apparatus, the image inputting or reading function, image outputting or printing function and group 3 facsimile communications function of the group 3 facsimile apparatus.

In a system configuration of the third embodiment shown in FIG. 8, the same reference numerals are given to components/units which correspond to those of the system configuration shown in FIG. 1. For components/units in the system configuration of the third embodiment which are substantially identical to the corresponding components/units of the system configuration of the first embodiment shown in FIG. 1, a duplicate description will be omitted.

An image storage device 30 stores a plurality of image data and so forth. An external interface circuit 31 connects the group 3 facsimile apparatus, shown in FIG. 8, to the personal computer apparatus(not shown in the figure), and thereby, various kinds of data are communicated between the group 3 facsimile apparatus and personal computer apparatus.

The CPU 1, FLROM 2, RAM 3, SRAM 4, FLROM writing circuit 5, clock circuit 6, scanner 8, plotter 9, operation and indication unit 10, coder/decoder unit 11, group 3 facsimile modem 12, network control device 13, coupler 14, image storage device 30 and external interface circuit 31 are connected to the internal bus 16. Data transmission between those components is mainly performed via the internal bus 16.

Data transmission between the network control device 13 and group 3 facsimile modem 12 is directly performed.

Figure 9:
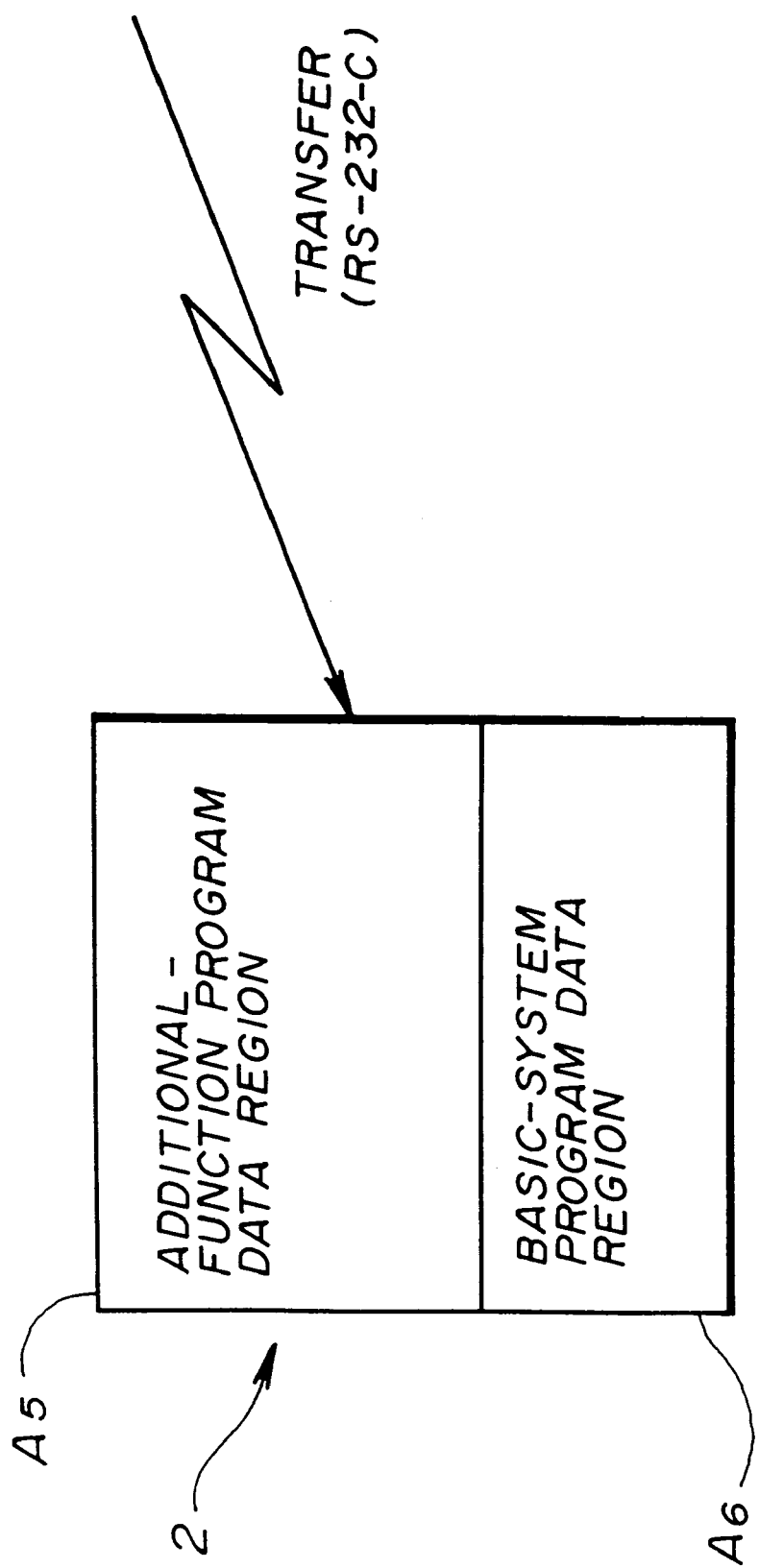
FIG. 9 shows division of a FLROM of the body apparatus of the group 3 facsimile apparatus shown in FIG. 8.

As shown in FIG. 9, in the third embodiment, the storage area of the FLROM 2 is divided into a basic-system program data region $A_6$ and an additional-function program data region $A_5$. In the basic-system program data region $A_6$, control program data for controlling the basic-system functions of the facsimile apparatus, performed by the facsimile apparatus itself when the facsimile apparatus is not connected to the personal computer apparatus via the external interface circuit 31, is stored. In the additional-function program data region $A_5$, additional-function program data which is executed during a condition where the group 3 facsimile apparatus is connected with the personal computer apparatus via the external interface circuit 31, and, thereby, the facsimile apparatus acts as an external apparatus of the personal computer apparatus.

Figure 10:
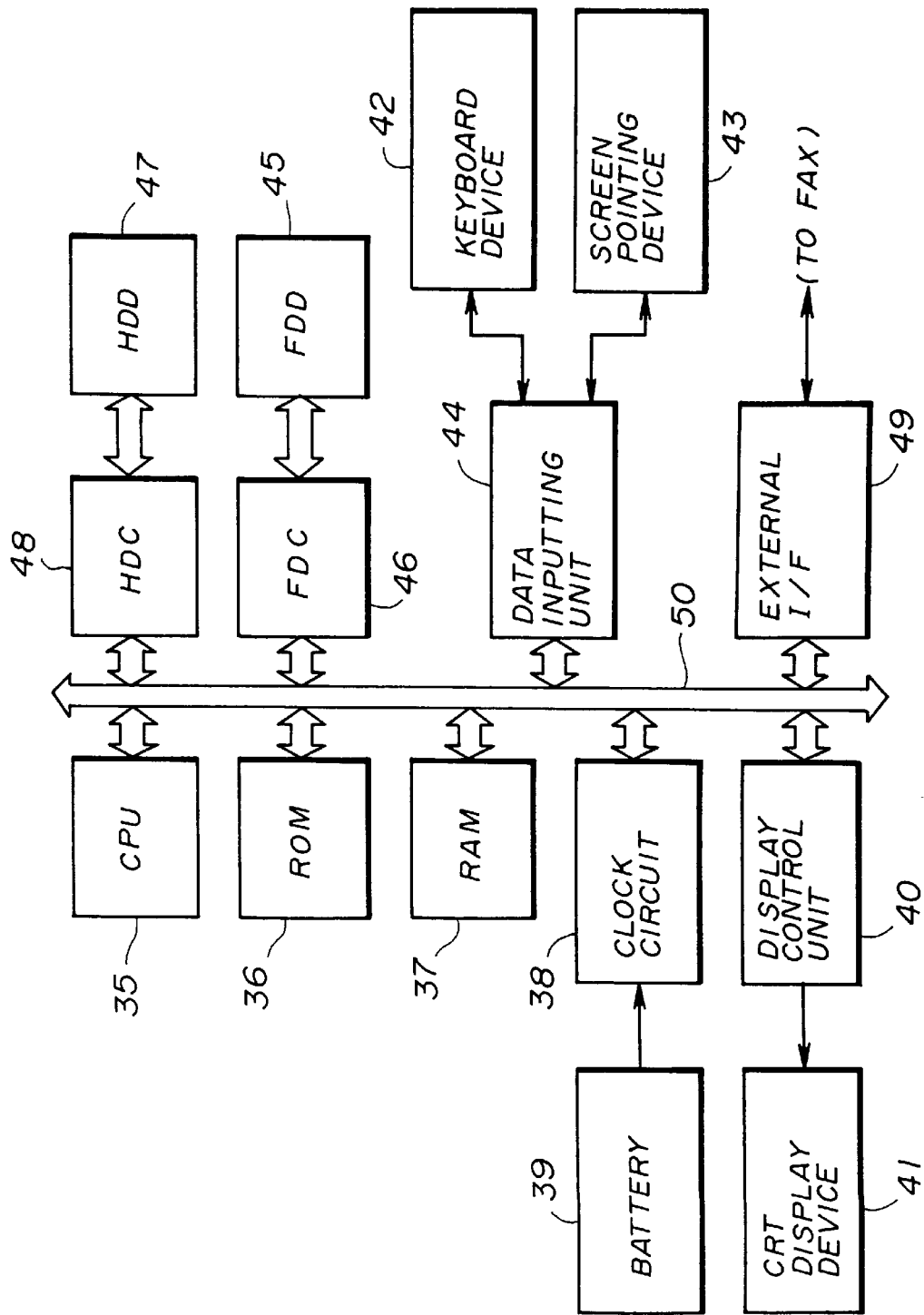
FIG. 10 shows a block diagram of a personal computer apparatus in the third embodiment of the present invention.

FIG. 10 shows an example of the system configuration of the personal computer apparatus in the third embodiment of the present invention.

With reference to FIG. 10, a CPU 35 controls operations of the personal computer apparatus. A ROM 36 stores program data and necessary parameter data and so forth for an initialization operation performed by the CPU 35. A RAM 37 configures the CPU 35 work area.

A clock circuit 38 outputs current date time information. A battery 39 supplies power, in particular during a commercial power supply failure, to the clock circuit 38. A display control circuit 40 controls display contents of a CRT display device 41, and the CRT display device 41 displays various kinds of information.

A keyboard device 42 is provided for a user to input various kinds of information. A screen pointing device 43 is provided for a user to specify a specific position in a screen image displayed on the CRT display device 41. A data inputting unit 44 inputs operation signals provided by the keyboard device 42 and screen pointing device 43 into the personal computer apparatus.

A floppy disk drive device 45 is an external storage device in which an information storage medium thereof can be replaced. A floppy disk control unit 46 controls an operation of the floppy disk drive device 45.

A hard disk drive device 47 is a large-storage-capacity external storage device in which an information storage medium thereof cannot be replaced. A hard disk control unit 48 controls an operation of the hard disk drive device 47.

An external interface circuit 49 is provided for connecting the personal computer apparatus with a group 3 facsimile apparatus such as that shown in FIG. 8. Thereby, various kinds of information is communicated between the personal computer apparatus and group 3 facsimile apparatus. As each of the external interface circuit 31 and 49, a serial data input/output interface circuit can be used.

The CPU 35, ROM 36, RAM 37, clock circuit 38, display control unit 40, data inputting unit 44, floppy disk control unit 46, hard disk control unit 48 and external interface circuit 49 are connected to an internal bus 50. Data transmission between these components is mainly performed via the internal bus 50.

The above-mentioned additional-function program data which is stored in the additional-function program data region $A_5$ of the FLROM 2 of the group 3 facsimile apparatus shown in FIGS. 8 and 9 is provided from a floppy disk (not shown in the figures), in a compressed state, loaded in the floppy disk drive device 45 of the personal computer apparatus. The thus-provided program data, in the compressed state, is stored in the hard disk drive device 47 of the personal computer apparatus, as will be described later.

In the above-described arrangement, a user of that personal computer apparatus causes the personal computer apparatus to execute usable application programs, and, thus, if necessary, uses the image reading function (scanner function) and the image outputting function (printer function) of that group 3 facsimile apparatus.

When the personal computer apparatus performs a function which the user requests, in a case where that function is the scanner function or printer function, the personal computer apparatus requests to that group 3 facsimile apparatus that the scanner function or printer function of the facsimile apparatus be used. Thus, the personal computer apparatus uses the scanner 8 or the plotter 9 of the group 3 facsimile apparatus.

For example, if the scanner function is used, the personal computer apparatus sends instructions to the group 3 facsimile apparatus that the scanner function is to be used.

Thereby, the operation and indication unit 10 of the group 3 facsimile apparatus provides an operation guidance message: 'set an original image paper sheet in a scanner and press a start key'.

The user, in response to this operation guidance message, sets the original image paper sheet in the scanner 8, and presses a start key (not shown in the figure) provided on the operation and indication unit 10.

Thereby, the group 3 facsimile apparatus performs an operation of reading an original image on that original image paper sheet. Thus, the facsimile apparatus obtains image data from the original image, and transfers the image data to the personal computer apparatus via the external interface circuit 31.

The personal computer apparatus receives that image data via the external interface circuit 49, and stores the received image data in the hard disk drive device 47. The personal computer apparatus informs the user (or provides information to a user process) that the image reading has been finished. (The user process is a process, which is requested or input by a user to the personal computer apparatus, such as a data transmission process.)

When the printer function is to be used, the personal computer apparatus sends the group 3 facsimile apparatus instructions that the printer function is to be used. Thereby, the group 3 facsimile apparatus prepares to print out image data through the plotter 8.

The personal computer apparatus forms a page of image data, and transfers the image data to the group 3 facsimile apparatus via the external interface circuit 49.

The group 3 facsimile apparatus receives that image data via the external interface circuit 31, and transfers the image data successively to the plotter 9. The plotter 9 prints out the transferred image data. Then, the group 3 facsimile apparatus informs the personal computer apparatus that the image data printing has been performed.

When that page of image data has been printed by the plotter 8 of the group 3 facsimile apparatus, the personal computer apparatus receives this information, indicating that the printing operation has finished. The personal computer apparatus provides this information to a user (or a user process such as that described above).

However, the personal computer apparatus can use the scanner function and printer function of the group 3 facsimile apparatus after the above-mentioned additional-function program data has been written in the FLROM 2 of the group 3 facsimile apparatus. The scanner function and printer function are additional functions of the group 3 facsimile apparatus to be added to the above-described basic-system functions of the group 3 facsimile apparatus. The additional functions of the group 3 facsimile apparatus do not need to be limited to those functions. Other various functions, such as the above-mentioned expanded-system functions which may comprise well-known functions such as the group 4 facsimile function, the basic function of which is standardized in the CCITT Group 4, and may be added to the function of the basic group 3 facsimile apparatus, the basic function thereof being standardized in the CCITT Group 3, the printer interface function, the roll-paper cutting functions, the fax-on-demand function, the video-on-demand function, or the like. When the user sends instructions that the group 3 facsimile apparatus will perform such additional functions, the personal computer apparatus sends instructions to the group 3 facsimile apparatus that the above-mentioned additional-function program data will be written in the FLROM 2 of the group 3 facsimile apparatus.

Thereby, in the group 3 facsimile apparatus, the FLROM writing circuit 5 sets the FLROM 2 in the condition in which data can be written in the FLROM 2. Then, the group 3 facsimile apparatus waits for transfer of additional-function compressed program data from the personal computer apparatus.

The additional-function compressed program data is program data obtained as a result of compressing, in a predetermined data compression method such as that described above, the above-mentioned additional-function program data.

That additional-function compressed program data is previously stored in hard disk drive device 47 of the personal computer apparatus. The personal computer apparatus reads the additional-function compressed program data from the hard disk drive device 47, and transfers it to the group 3 facsimile apparatus via the external interface circuit 49.

The group 3 facsimile apparatus receives that transferred additional-function compressed program data via the external interface circuit 31. The group 3 facsimile apparatus then decompresses that received compressed program data, and thus obtains the original additional-function program data, which is then written in the additional-function program data region $A_5$ of the FLROM 2. When all the additional-functin program data has been written in the FLROM 2, the FLROM writing circuit 5 sets the FLROM 2 in the condition where data cannot be written in the FLROM 2.

After that additional-function program data is written in the FLROM 2 of the group 3 facsimile apparatus, the group 3 facsimile apparatus can accept instructions from the personal computer apparatus that such additional functions as the scanner function and plotter function of the group 3 facsimile apparatus will be used.

The group 3 facsimile apparatus receives instructions to receive, decompress and write the additional-function compressed program data transferred from the personal computer. This is performed by the CPU 1 of the group 3 facsimile apparatus as a result of executing the basic-system program data which is previously stored in the basic system program data region $A_6$ of the FLROM 2. Then, after the additional-function program data is stored in the FLROM 2, the CPU 1 of the group 3 facsimile apparatus appropriately accesses the additional-function program data stored in the FLROM 2 and performs predetermined additional functions of the group 3 facsimile apparatus. In a case where the FLROM 2 is a type of memory in which data reading from the memory cannot be performed during the process of data writing in the memory, the basic-system program data is previously copied to another memory, the basic-system program data is read out from the other memory, and those operations that the additional-function compressed program data is decompressed and then written in the FLROM 2 can be performed.

In this system in the third embodiment of the present invention, it is also possible that the contents stored in the FLROM 2 of the group 3 facsimile apparatus can be updated by the personal computer apparatus. Thereby, it is possible to flexibly configure a computer system.

Figure 11:
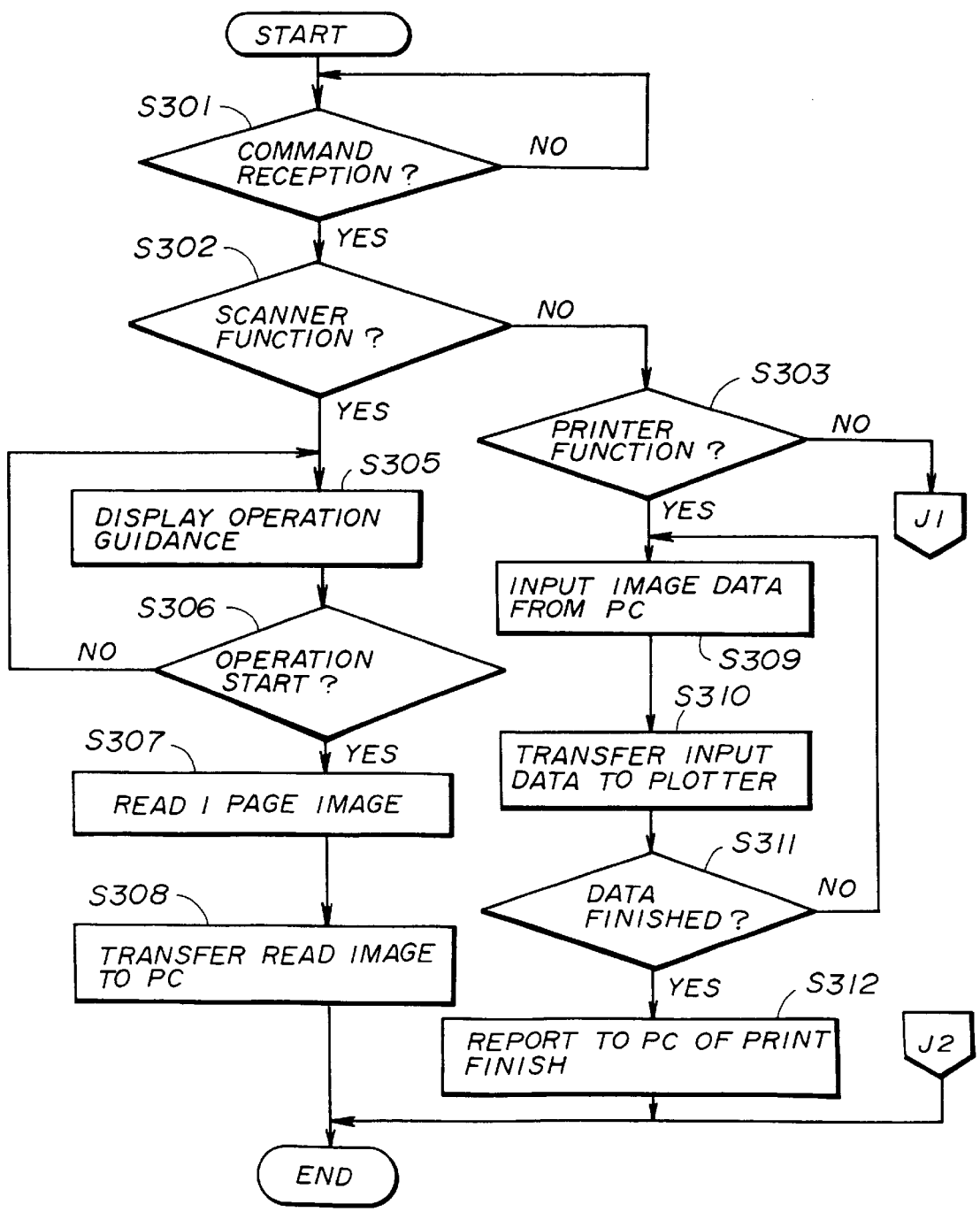
FIGS. 11 and 12 show an operation flowchart as an example of processing performed by the group 3 facsimile apparatus in the third embodiment of the present invention, as an external apparatus of the personal computer apparatus.
Figure 12:
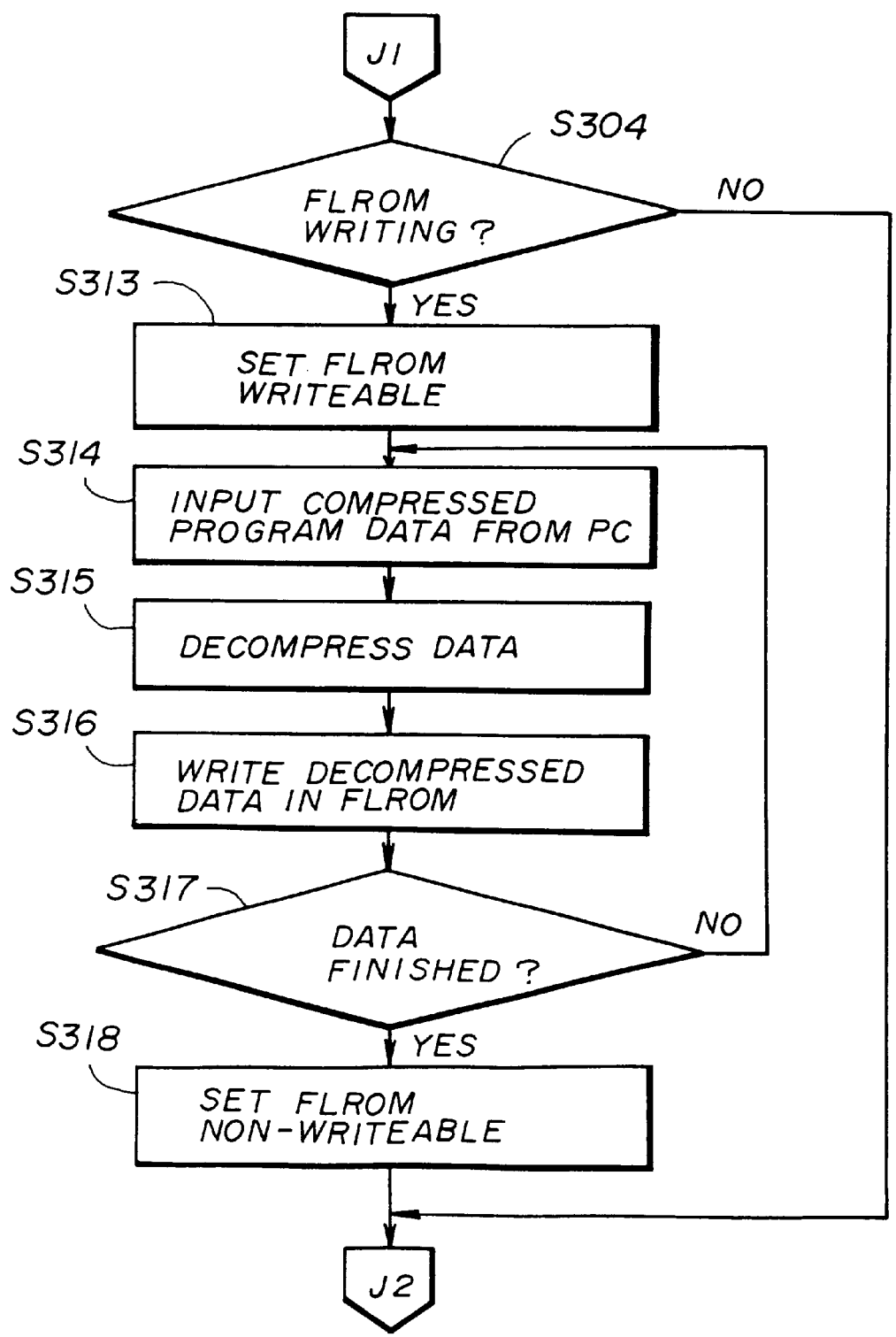

With reference to FIGS. 11 and 12, an example of processing performed by the group 3 facsimile apparatus in the third embodiment of the present invention, as an external apparatus of the personal computer apparatus, will now be described.

The group 3 facsimile monitors whether or not any command is provided by the personal computer apparatus in S301. If any command is received from the personal computer apparatus, the determination result of S301 is YES. As a result, it is determined whether the received command indicates a scanner function request, printer function request or FLROM writing request, in S302, S303 and S304 (shown in FIG. 12). If it is determined that the received command indicates none of those requests, the received command is ignored.

When the received command indicates the scanner function request, the determination result of S302 is YES. As a result, the above-mentioned operation guidance message is displayed on the operation and indication unit 10, and a start key pressing operation is awaited, in S305, S306.

When the start key is pressed by the user and the determination result of S306 is YES, the scanner 8 performs the above-mentioned original image reading operation in S307. The image data is successively transferred to the personal computer apparatus via the external interface circuit 31, in S308. Then, the current operations are finished. Thus, the group 3 facsimile apparatus acts as a scanner for the personal computer apparatus.

When that received command indicates the printer function request, and the determination result of S303 is YES, the group 3 facsimile apparatus waits for transfer of image data to be printed from the personal computer apparatus via the external interface circuit 31. When the image data to be printed is input to the group 3 facsimile apparatus, in S309, the input image data is successively transferred to the plotter 9, in S310. Steps S309 and S310 are repeatedly performed until a page of the image data has been transferred to the plotter 9. Then the page of image data is transferred to the plotter, and the determination result of S311 is YES. This information, indicating that the data transfer has been finished, is transferred to the personal computer apparatus, in S312, and, then, the current operations are finished. The page of image data transferred to the plotter 9 is printed by the plotter 9. Thus, the group 3 facsimile apparatus acts as a printer of the personal computer apparatus.

When the received command indicates the FLROM writing request, and the determination result of S304 is YES, the FLROM writing circuit 5 sets the FLROM 2 in the state in which data can be written in the FLROM 2, in S313. The group 3 facsimile apparatus inputs the additional-function compressed program data via the external interface circuit 31, in S314, and, decompresses that received program data into the original additional-function program data, in S315. The decompressing method is a decompressing method suitable for decompressing data which was compressed in the compression method which was used for compressing the original additional-function program data into the additional-function compressed program data.

The additional-function program data is written in the FLROM 2 in S316. Steps S314, S315 and S316 are repeatedly performed until all the additional-function compressed program data has been processed.

After all the additional-function compressed program data has been processed, all the additional-function program data has been written in the FLROM 2, and the determination result of S317 is YES, the FLROM writing circuit 5 sets the FLROM 2 in the state in which data cannot be written in the FLROM 2, in S318. Then, the current operations are finished.

Figure 13:
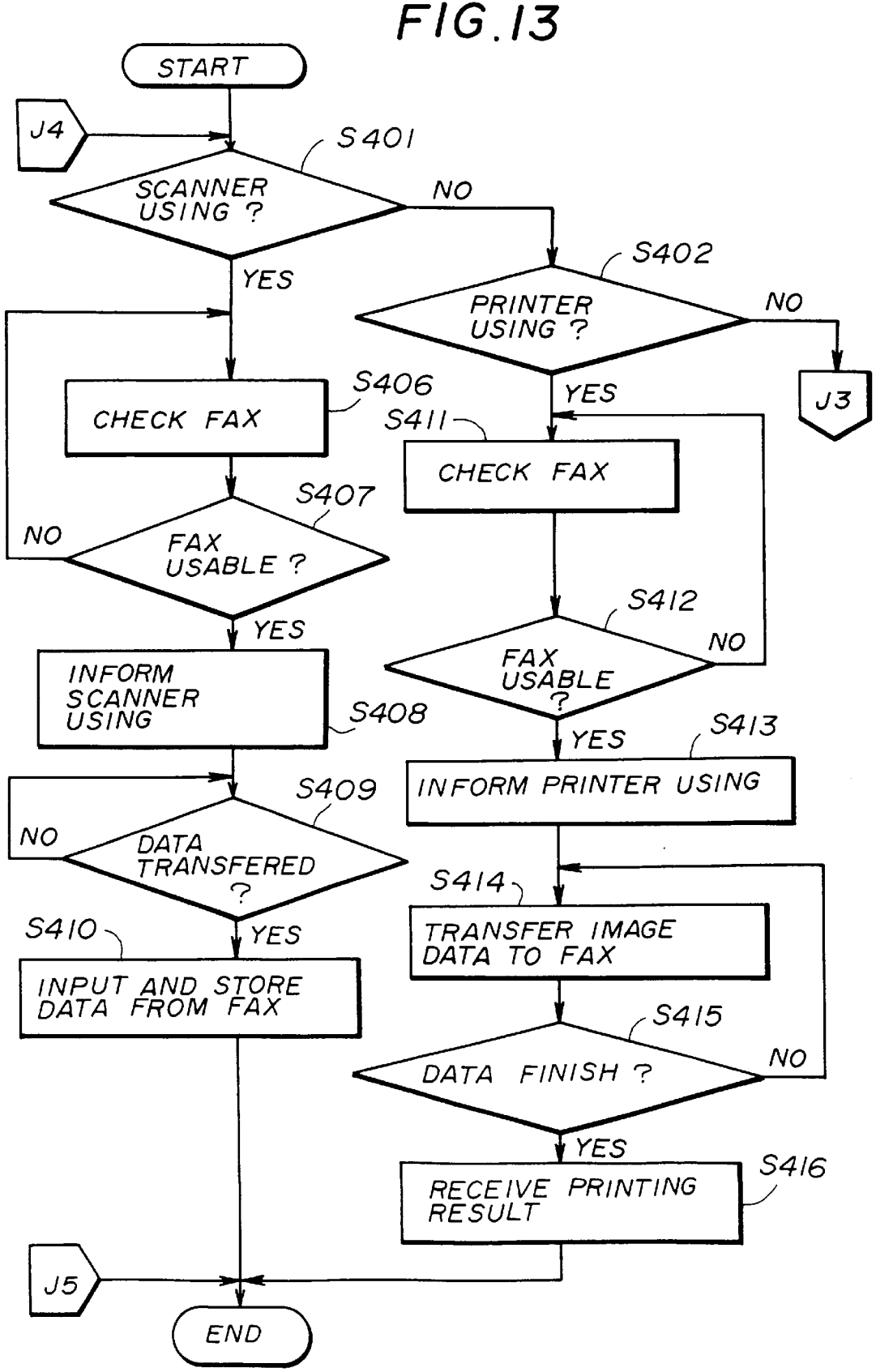
FIGS. 13 and 14 show an operation flowchart in the third embodiment of the present invention as an example of processing performed by the personal computer apparatus when the group 3 facsimile apparatus, which is connected to the personal computer apparatus as an external apparatus.
Figure 14:
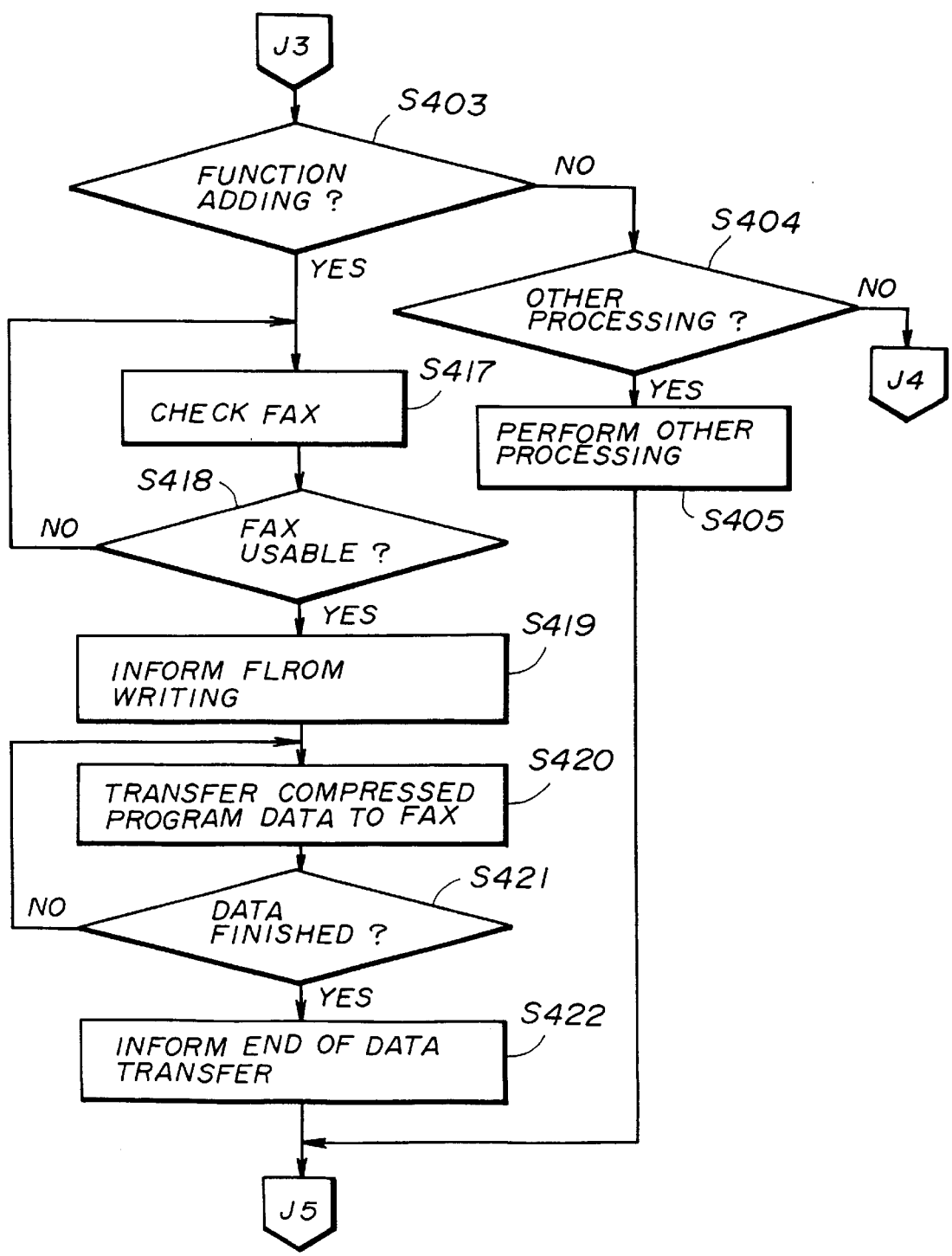

With reference to FIGS. 13 and 14, in the third embodiment of the present invention, an example of processing performed by the personal computer apparatus when the group 3 facsimile apparatus, which is connected to the personal computer apparatus as an external apparatus, is used, will now be described.

The personal computer apparatus waits for a processing request, given by a user (or a user process such as that described above), such as the scanner using request, printer using request, group 3 facsimile additional function adding request, or other processing requests, in a loop of S401, S402, S403 and S404. When another processing request is given and the determination result of S404 (shown in FIG. 14) is YES, the other processing is performed in S405.

When the scanner using request is given, and the determination result of S401 is YES, the state of the group 3 facsimile apparatus is monitored via the external interface circuit 49, and the personal computer apparatus waits until it is determined that the group 3 facsimile apparatus is in a 'usable condition', which is a condition where the group 3 facsimile apparatus can be used, in a loop of S406 and S407. For example, if this group 3 facsimile apparatus is being used by another user, or a power supply switch of this facsimile apparatus has not been switched on, it is not determined that this facsimile apparatus is in the usable condition, in S406.

If the determination result of S407 is YES, the personal computer apparatus provides the scanner function request command, indicating that the scanner function will be used, to the group 3 facsimile apparatus, in S408. In S409, the personal computer apparatus waits for data transfer via the external interface circuit 49.

Then data is transferred via the external interface circuit 49, the transferred data is stored in the hard disk drive device 47, in S410. Then, the current operations are finished.

When the printer using request is given and the determination result of S402 is YES, the personal computer apparatus monitors the state of the group 3 facsimile apparatus via the external interface circuit 49, and waits until it is determined that the group 3 facsimile apparatus is in a 'usable condition', which is a condition where the group 3 facsimile apparatus can be used, in a loop of S411 and S412. For example, as described above, if this group 3 facsimile apparatus is being used by another user, or a power supply switch of this facsimile apparatus has not been switched on, it is not determined that this facsimile apparatus is in the usable condition, in S411.

When the determination result of 412 is YES, the personal computer apparatus provides the printer function request command, indicating that the printer function will be used, to the group 3 facsimile apparatus, in S413. The personal computer apparatus forms a page of image data to be printed, and transfers the formed image data to the group 3 facsimile apparatus via the external interface circuit 49, in a loop of S414 and S415.

When the page of image data has been completely transferred and the determination result of S415 is YES, this information, indicating that the data transfer has been finished, is transferred to the personal computer apparatus via the external interface circuit 49, in S416. Then, the current operations are finished.

When the addition function adding request is given and the determination result of S403 is YES, the personal computer apparatus monitors the state of the group 3 facsimile apparatus via the external interface circuit 49, and waits until it is determined that the group 3 facsimile apparatus is in a 'usable condition', which is a condition where the group 3 facsimile apparatus can be used, in a loop of S417 and S418. For example, as described above, if this group 3 facsimile apparatus is being used by another user, or a power supply switch of this facsimile apparatus has not been switched on, it is not determined that this facsimile apparatus is in the usable condition, in S417.

When the determination result of 418 is YES, the personal computer apparatus provides the FROM writing request command, indicating that an additional function of the group 3 facsimile apparatus will be added, to the group 3 facsimile apparatus, in S419. The personal computer apparatus then transfers all the above-mentioned additional-function compressed program data stored in the hard disk drive device 47 to the group 3 facsimile apparatus via the external interface circuit 49, in a loop of S420 and S421.

When the additional-function compressed program data has been completely transferred and the determination result of S421 is YES, this information, indicating that the compressed program data transfer has been finished, is transferred to the group 3 facsimile apparatus via the external interface circuit 49, in S422. Then, the current operations are finished.

In the foregoing descriptions, particular cases have been presented where the scanner function and printer function are provided by the group 3 facsimile apparatus to the personal computer apparatus. However, applications of the present invention do not need to be limited thereto. It is also possible, according to a basic concept of the third embodiment of the present invention that other various system functions of the group 3 facsimile apparatus are provided to the personal computer apparatus, such as the group 4 facsimile function, the basic function of which is standardized in the CCITT Group 4, and may be added to the function of the basic group 3 facsimile apparatus, the basic function thereof being standardized in the CCITT Group 3, the printer interface function, the roll-paper cutting functions the fax-on-demand function, the video-on-demand function, or the like. In the third embodiment of the present invention, because the additional-function program data is stored in the external storage device of the personal computer apparatus, it is also possible that such additional-function program data is stored in such an external storage device in a non-compressed state.

Further, in the third embodiment, no option unit such as the SRAM card 15 described above is loaded in the group 3 facsimile apparatus. However, it is also possible that such an option unit is loaded in the group 3 facsimile apparatus in the third embodiment. In other words, it is possible that the features of the above-described first, second and third embodiments of the present invention can be appropriately combined by persons skilled in the art.

Further, the present invention is not limited to the above-described embodiments, and variations and modifications may be made without departing from the claimed scope of the present invention.

What is claimed is:

1. A data processing apparatus, comprising:
   a body apparatus which performs facsimile basic-system functions, said body apparatus comprising optional-function compressed program data storage means, said optional-function compressed program data storage means storing optional-function compressed program data;
   an option unit for automatically enabling said data processing apparatus to perform optional facsimile functions, other than said facsimile basic-system functions responsive to a loading of the option unit in said body apparatus and without any input from a user, said option unit comprising optional-function program data storage means; and
   optional-function program data processing means, responding to said optional unit being loaded in said body apparatus, for automatically reading said optional-function compressed program data from said optional-function compressed program data storage means, decompressing said optional-function compressed program data, storing decompressed optional-function program data in said optional-function program data storage means of said option unit, and executing said decompressed optional-function program data stored in said optional-function program data storage means of said option unit, and performing said optional facsimile functions of said data processing apparatus without any input from the user.

2. The apparatus according to claim 1, wherein each of said optional-function compressed program data storage means of said body apparatus and said optional-function program data storage means of said option unit comprises a flash read only memory.

3. The apparatus according to claim 1, wherein said optional-function program data processing means determines whether a version number of data previously stored in said optional-function program data storage means of said option unit is coincident with a version number of a basic-system program data for performing said facsimile basic-system functions of said body apparatus; and
   said optional-function program data processing means overwrites an optional-function program data obtained from decompressing said optional-function compressed program data stored in said optional-function compressed program data storage means of said body apparatus over said data previously stored in said optional-function program data storage region of said option unit when said version number of said data previously stored in said optional-function program data storage means of said option unit does not coincide with said version number of said basic-system program data.

4. A data processing apparatus, comprising:
   a body apparatus which performs facsimile basic-system functions, said body apparatus comprising optional-function program data storage means;
   an option unit for automatically enabling said data processing apparatus to perform optional facsimile functions, other than said facsimile basic-system functions responsive to a loading of said option unit in said body apparatus and without any input from a user, said option unit comprising optional-function program data storage means; and
   optional-function program data processing means, responding to said optional unit being loaded in said body apparatus, for automatically reading said optional-function compressed program data from said optional-function compressed program data storage means of said option unit, decompressing said optional-function compressed program data, storing decompressed optional-function program data in said optional-function program data storage means of said body apparatus and executing said decompressed optional-function program data stored in said optional-function program data storage means of said body apparatus, and performing said optional facsimile functions of said data processing apparatus without any input from the user.

5. The apparatus according to claim 4, wherein each of said optional-function compressed program data storage means of said option unit and said optional-function program data storage means of said body apparatus comprises a flash read only memory.

6. A data processing apparatus, comprising:
   basic-system function performing means for performing facsimile basic-system functions, said basic-system function performing means comprising optional-function program data storage means;
   an external apparatus;
   data communication means for automatically enabling said data processing apparatus to perform optional facsimile functions, other than said facsimile basic-system functions responsive to communicating with said external apparatus via said data communication means and without any input from a user; and
   optional-function program data processing means for automatically receiving optional-function compressed program data from said external apparatus via said data communication means, decompressing said optional-function compressed program data, storing decompressed optional-function program data in said optional-function program data storage means of said basic-system function performing means and executing said decompressed optional-function program data stored in said optional-function program data storage means of said basic-system function performing means, and performing said optional facsimile functions of said data processing apparatus without any input from the user.

7. The apparatus according to claim 6, wherein said optional-function program data storage means of said basic-system function performing means comprises a flash read only memory.

8. A data processing system, comprising:

basic-system function performing means for performing facsimile basic-system functions, said basic-system function performing means comprising optional-function program data storage means;

a general-purpose computer apparatus;

data communication means, connected with said general-purpose computer apparatus, said basic-system function performing means automatically performing optional facsimile functions, other than said facsimile basic-system functions, responsive to communicating with said general-purpose computer apparatus via said data communication means and without any input from a user; and optional-function program data processing means for automatically receiving optional-function compressed program data from said general-purpose computer apparatus via said data communication means, decompressing said optional-function compressed program data, storing decompressed optional-function program data in said optional-function program data storage means of said basic-system function performing means and executing said decompressed optional-function program data stored in said optional-function program data storage means of said basic-system function performing means, and performing said optional facsimile functions without any input from the user.

9. The data processing system according to claim 8, wherein said optional-function program data storage means of said basic-system function performing means comprises a flash read only memory.

10. The data processing system according to claim 8, wherein said optional functions comprise at least one of a printer function and a scanner function.

11. A data processing apparatus, comprising:

a body apparatus which performs facsimile basic-system functions, said body apparatus comprising an optional-function compressed program memory, said optional-function compressed program memory storing optional-function compressed program data;

an option unit for automatically enabling said data processing apparatus to perform optional facsimile functions, other than said facsimile basic-system functions responsive to a loading of the option unit in said body apparatus and without any input from a user, said option unit comprising an optional-function program memory; and an optional-function program processor, responding to said optional unit being loaded in said body apparatus, for automatically reading said optional-function compressed program data from said optional-function compressed program memory, decompressing said optional-function compressed program data, storing decompressed optional-function program data in said optional-function program memory of said option unit and executing said decompressed optional-function program data stored in said optional-function program memory of said option unit, and performing said optional facsimile functions of said data processing apparatus without any input from the user.

12. The apparatus according to claim 11, wherein each of said optional-function compressed program memory of said body apparatus and said optional-function program memory of said option unit comprises a flash read only memory.

13. The apparatus according to claim 11, wherein said optional-function program processor determines whether a version number of data previously stored in said optional-function program memory of said option unit is coincident with a version number of a basic-system program data for performing said facsimile basic-system functions of said body apparatus; and said optional-function program processor overwrites an optional-function program data obtained from decompressing said optional-function compressed program data stored in said optional-function compressed program memory of said body apparatus over said data previously stored in said optional-function program data storage region of said option unit when said version number of said data previously stored in said optional-function program memory of said option unit does not coincide with said version number of said basic-system program data.

14. A data processing apparatus, comprising:

a body apparatus which performs facsimile basic-system functions, said body apparatus comprising an optional-function compressed program memory;

an option unit for automatically enabling said data processing apparatus to perform optional facsimile functions, other than said facsimile basic-system functions responsive to a loading of said option unit in said body apparatus and without any input from a user, said option unit comprising optional-function program memory; and optional-function program processor, responding to said optional unit being loaded in said body apparatus, for automatically reading said optional-function compressed program data from said optional-function compressed program memory of said option unit, decompressing said optional-function compressed program data, storing decompressed optional-function program data in said optional-function program memory of said body apparatus and executing said decompressed optional-function program data stored in said optional-function program memory of said body apparatus, and performing said optional facsimile functions of said data processing apparatus without any input from the user.

15. The apparatus according to claim 14, wherein each of said optional-function compressed program memory of said option unit and said optional-function program memory of said body apparatus comprises a flash read only memory.

16. A data processing apparatus, comprising:

a basic-system function device for performing facsimile basic-system functions, said basic-system function device comprising an optional-function program memory;

an external apparatus;

a data communication device for automatically enabling said data processing apparatus to perform optional facsimile functions, other than said facsimile basic-system functions responsive to communicating with said external apparatus via said data communication means and without any input from a user; and an optional-function program processor for automatically receiving optional-function compressed program data from the external apparatus via said data communication device, decompressing said optional-function compressed program data, storing decompressed optional-function program data in said optional-function program memory of said basic-system function device and executing said decompressed optional-function program data stored in said optional-function program memory of said basic-system function device, and performing said optional facsimile functions of said data processing apparatus without any input from the user.

17. The apparatus according to claim 16, wherein said optional-function program memory of said basic-system function device comprises a flash read only memory.

18. A data processing system, comprising:

a basic-system function device for performing facsimile basic-system functions, said basic-system function device comprising optional-function program memory;

a general-purpose computer;

a data communication device, connected with said general-purpose computer, said basic-system function device automatically performing optional facsimile functions, other than said facsimile basic-system functions, responsive to communicating with said general-purpose computer via said data communication device and without any input from a user; and an optional-function program processor for automatically receiving optional-function compressed program data from said general-purpose computer via said data communication device, decompressing said optional-function compressed program data, storing decompressed optional-function program data in said optional-function program memory of said basic-system function device and executing said decompressed optional-function program data stored in said optional-function program memory of said basic-system function device, and performing said optional facsimile functions without any input from the user.

19. The system according to claim 18, wherein said optional-function program memory of said basic-system function device comprises a flash read only memory.

20. The system according to claim 18, wherein said optional functions comprise at least one of a printer function and a scanner function.

* * * * *